United States Patent [19]
Weibel

[11] Patent Number: 5,648,046
[45] Date of Patent: Jul. 15, 1997

[54] METHOD AND A SYSTEM FOR DISINFECTING AIR IN AIR CONDITIONING DUCTS

[76] Inventor: Rene Weibel, Schützenmattstrasse 38, CH-4051 Basel, Switzerland

[21] Appl. No.: 325,418

[22] PCT Filed: Apr. 28, 1993

[86] PCT No.: PCT/NL93/00089

§ 371 Date: Oct. 28, 1994

§ 102(e) Date: Oct. 28, 1994

[87] PCT Pub. No.: WO93/22603

PCT Pub. Date: Nov. 11, 1993

[30] Foreign Application Priority Data

Apr. 28, 1992 [CH] Switzerland ............... 1375/92

[51] Int. Cl.$^6$ ............................................. F24F 3/16
[52] U.S. Cl. ................... 422/4; 422/22; 422/33; 422/108; 422/121; 422/123; 95/64; 95/72
[58] Field of Search ........................... 422/4, 22, 28, 422/33, 108, 110, 120, 121, 123; 95/64, 71, 72; 96/52, 53, 74; 55/279

[56] References Cited

U.S. PATENT DOCUMENTS

| | | | |
|---|---|---|---|
| 2,043,217 | 6/1936 | Yaglou | 422/4 |
| 2,343,338 | 3/1944 | Steel | 422/4 |
| 3,493,323 | 2/1970 | Demuth | 422/28 |
| 3,503,704 | 3/1970 | Marks | 96/52 |
| 3,665,676 | 5/1972 | McKewen | 96/52 |
| 3,757,491 | 9/1973 | Gourdine | 55/279 |
| 3,891,415 | 6/1975 | Watanabe | 96/53 |
| 5,196,171 | 3/1993 | Peltier | 422/5 |
| 5,368,816 | 11/1994 | Detzer | 422/4 |

FOREIGN PATENT DOCUMENTS

| | | |
|---|---|---|
| 0355765 | 2/1990 | European Pat. Off. . |
| 2414337 | 8/1979 | France . |

Primary Examiner—Nina Bhat
Attorney, Agent, or Firm—Speckman, Pauley & Fejer

[57] ABSTRACT

A method and system for disinfecting air in ventilation ducts, using a non-poisonous and substantially non-volatile disinfectant. The disinfectant is vaporized by microvaporizer, and ionization electrodes ionize the air and the disinfectant particles. An ozone sensor is located downstream of the ionization electrodes and emits a signal to a controller, which controls the voltage at the ionization electrode, and thus the production of ozone is controlled.

6 Claims, 1 Drawing Sheet

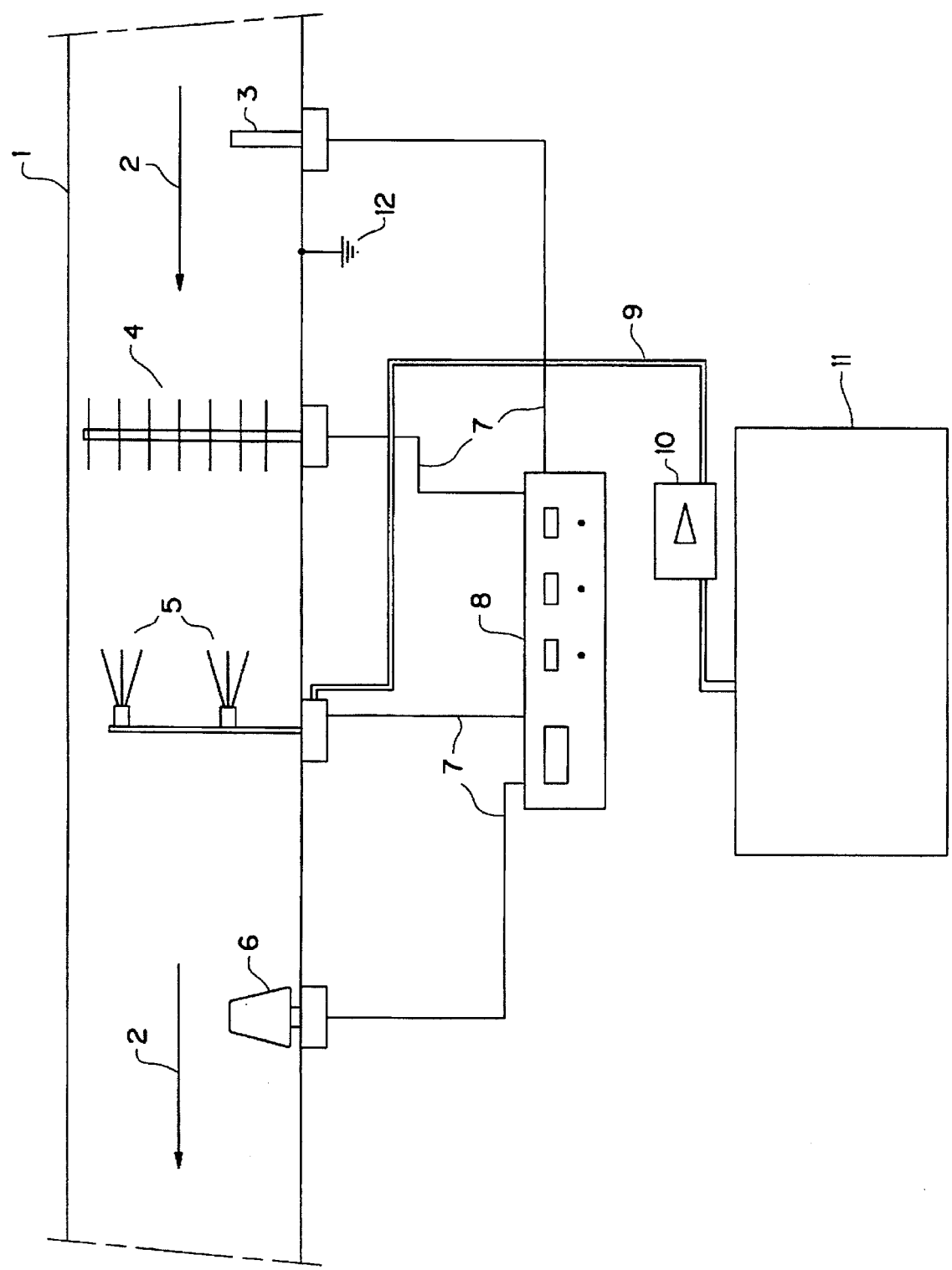

METHOD AND A SYSTEM FOR DISINFECTING AIR IN AIR CONDITIONING DUCTS

BACKGROUND OF THE INVENTION

1. Field of the Invention

When, in closed spaces, air is supplied by air supply and/or conditioning ducts, it is desired that irritating or harmful germs, in particular fungi, algae, microbes, viruses and the like, not be introduced into the space since they can harm the health or at least the comfort of persons present therein.

2. Description of Prior Art

A disadvantage of air filters is that they will generally be unable to completely remove such germs, so that the germs let through can develop further, and, when improving the filtering efficiency, the pressure drop over such filters will increase accordingly. In the case of moist and warm air, very favorable conditions for the growth of such germs can occur.

A good air disinfection is especially important when a substantial part of the air introduced into the closed space is recycled, as, for instance, in airplanes.

Eliminating germs with poisonous substances is not allowed in most countries, if these substances can reach the space in which persons are present.

SUMMARY OF THE INVENTION

It is one object of this invention to provide a method for disinfecting air in ventilation ducts, in which a non-poisonous and substantially non-volatile disinfectant in water, preferably a quaternary ammoinia complex, is vaporized into the air flow in the duct by a micro-vaporizer. The air is ionized without substantial ozone production, and the ionized particles are deposited on the walls of the duct. The walls of the duct are kept at ground potential with respect to the air-ionization electrodes.

It is another object of this invention to provide a system for disinfecting air comprising vaporizing nozzles connected to a reservoir, and ionization electrodes for ionizing the air flow. An ozone sensor is positioned downstream of the vaporizing nozzles and ionization electrodes, and can control the voltage at the ionization electrodes.

The non-poisonous disinfectant kills fungi, algae and similar organisms, and is active not only in the air flow itself, but, by precipitation thereof is also active on the walls of the duct. Thus, the germs precipitating on the walls of the duct can be effectively suppressed. When, moreover, the air is ionized, not only microbes and viruses will be effectively suppressed, but also the vaporized disinfectant particles will be charged, so that the disinfectant particles will deposit even faster on the duct walls. When the air flowing through the duct is to be moistened, preferably the same disinfectant is added to the water used therefor, in order to counteract thereby the introduction of harmful germs into the duct.

This invention will be described below in more detail by reference to a diagram of a system according to one embodiment of this invention.

BRIEF DESCRIPTION OF THE DRAWINGS

FIG. 1 is a diagram of a system according to one embodiment of this invention.

DESCRIPTION OF PREFERRED EMBODIMENT

In the air ventilation duct 1, are consecutively arranged a flow sensor 3, an assembly 4 of particularly needle-shaped air ionisation electrodes, an assembly 5 of disinfectant vaporizers, and an ozone sensor 6. The direction of the flow of air is indicated by the arrows 2.

These elements are connected, by electric leads 7, with a control apparatus 8 which also comprises a high-voltage source for the electrodes 4, the vaporizers 5 being connected, by a tube 9, with a pump 10 which can pump the disinfectant dissolved in water from a reservoir 11.

The flow sensor 3 can disconnect the pump 10, and, if required, also the electrodes 4, if the air flow 2 decreases below a given threshold value. It is also possible to control the operation of the pump 10 by the flow sensor 3. The ozone sensor 6 can lower the voltage at the electrodes 4 if an ozone content threshold is exceeded. This voltage should, generally, be lower than 10 kV. In this manner more than $10^{12}$ ions/s can be produced at a current intensity of some µA.

The air ionization, in particular when producing negative ions, will cause microbes, viruses and similar microorganisms present in the air flow to be annihilated. A very important effect of this ionization is, furthermore, that the disinfectant particles are also being charged. Thus disinfectant particles will be driven towards the duct walls, which, as indicated at 12, are grounded, so that these particles will deposit on the duct walls. If fungi, algae or the like also deposit on the walls, they will be killed, or at least their growth will be inhibited, by the continued contact with the disinfectant in such a degree that no dangerous growth thereof will occur.

Since the air flow in the duct 1 will, eventually, reach the working or living space, the disinfectant should comply with the most severe requirements imposed by public health services. Therefore it should not contain mercury, formaldehyde, phenol or the like, and, because of fire hazard, in particular in the case of ionization, the use of alcohol is not allowed either.

The disinfectant used according to one embodiment of this invention is a quaternary ammonium compound, commercially available under the name "Dessair 2000", and being approved by the Swiss inspection service as being non-poisonous ("Giftklasse Frei" BAG T 73512 DC).

According to one embodiment of this invention this disinfectant comprises a benzyl ammonium chloride selected from the group consisting of n-octyldimethyl, 1,1, 3,3-tetrabutyl phenoxy ethyldimethyl and 1,1,3,3-tetrabutyl-o-ethoxydimethyl benzyl ammonium chloride. The invention is, however, not restricted to these examples.

This disinfectant is sold in concentrated form (16% active substance), and the concentrate will, for example, be added to the water in the reservoir 11 in a ratio of 1:100, so that the disinfectant has a concentration of 0.16%. Preferably demineralized water is used therefor.

The mist particles formed by the vaporizers 5 having, for example, a mean size of about 50 µm, precipitate on the walls of the duct, in particular because they obtain a charge by the ionization of the air, causing them to be attracted towards the duct walls, and the water then evaporates. Some decomposition may take place, which, however, will not lead to noxious products. This disinfectant is, moreover, active against odors, in particular disagreeable odors. At the average vapor particle size of about 50 µm, an amount of about 0.06 to 0.08 ml/m³ of the disinfectant is vaporized in the air at a positive pressure of about 0.35 MPa.

When air moistening is required, water can be vaporized in a suitable location of the duct 1 and under control of the control apparatus 8, and, a humidity sensor can also be used.

Preferably the same disinfectant is added to this water so as to counteract the introduction of fungi, algae and the like.

According to one embodiment of this invention the system can comprise a microprocessor, and can be connected remotely thus allowing remote control or measurement.

I claim:

1. In a method for disinfecting air in a ventilation duct, wherein a non-poisonous and substantially non-volatile disinfectant is vaporized into the air flowing in the duct as an aerosol by means of microvaporizers, the improvement comprising the steps of: first, ionizing the air flowing in the duct and thereby producing an ionized air flow with an amount of ozone; second, electrically charging suspended disinfectant particles in the ionized air flow; and maintaining an electrical potential difference between an interior surface of the duct and a plurality of ionization electrodes exposed to the air flow.

2. In a method of claim 1 wherein the disinfectant is in a concentration of about 0.16% -in water, and an amount of about 0.06–0.08 ml/m$^3$ of the disinfectant is vaporized in the air at a positive pressure of about 0.35 MPa at an average vapor particle size of about 50 μm.

3. In a method according to claim 2, wherein the disinfectant humidifies the air.

4. In a system for disinfecting air, having an air duct (1), wherein an air flow (2) is disinfected, and an assembly of vaporizing nozzles (5) are exposed to the air flow (2) and in communication with a reservoir (11) containing dissolved disinfectant, the improvement comprising: a plurality of needle-shaped ionization electrodes (4) positioned within the air duct (1) upstream of the vaporizing nozzles (5), said ionization electrodes (4) connected to a high-voltage source, an ozone sensor (6) positioned downstream of said ionization electrodes (4) and electrically coupled to a control means (8) for controlling the high-voltage source, and walls of the air duct (1) maintained at a fixed electrical potential difference and being grounded with respect to said ionization electrodes (4).

5. In a system according to claim 4, wherein a metering pump (16) is in communication with said nozzles (5) and said reservoir (11) and a flow meter (3) is positioned in the air duct (1), the flow meter (3) is electrically connected to the control means (8), and the control means (8) is electrically connected to the metering pump (10).

6. In a method according to claim 1, wherein the disinfectant humidifies the air.

* * * * *